United States Patent [19]
Pawlowicz et al.

[11] Patent Number: 5,730,411
[45] Date of Patent: Mar. 24, 1998

[54] ANTI-ROTATIONAL LINK FOR REARWARD IMPACT LOADING ON VEHICLE POWER SEAT ADJUSTER

[75] Inventors: Brian D. Pawlowicz, Rochester Hills; Joseph C. Montano, Troy, both of Mich.

[73] Assignee: Lear Corporation, Southfield, Mich.

[21] Appl. No.: 575,473

[22] Filed: Dec. 20, 1995

[51] Int. Cl.$^6$ .................................................. F16M 13/00
[52] U.S. Cl. ........................... 248/421; 248/424; 248/419
[58] Field of Search ............................ 248/419, 421, 248/424, 429

[56] References Cited

U.S. PATENT DOCUMENTS

| | | | |
|---|---|---|---|
| 1,992,733 | 2/1935 | Bayer | 248/421 X |
| 2,609,029 | 9/1952 | Haberstump | 248/421 X |
| 3,198,473 | 8/1965 | Holz | 248/419 X |
| 4,015,812 | 4/1977 | Heesch . | |
| 4,432,583 | 2/1984 | Russo . | |
| 4,522,078 | 6/1985 | Fukutz . | |
| 4,527,767 | 7/1985 | Rees | 248/429 X |
| 4,828,213 | 5/1989 | Saito et al. | 248/421 |
| 4,880,199 | 11/1989 | Harney . | |
| 4,979,716 | 12/1990 | Holdampf . | |
| 4,993,678 | 2/1991 | Easter . | |
| 5,022,707 | 6/1991 | Beauvais et al. | 248/424 X |
| 5,112,018 | 5/1992 | Wahls . | |
| 5,217,195 | 6/1993 | Tanaka et al. . | |
| 5,224,749 | 7/1993 | Gauger et al. . | |
| 5,316,258 | 5/1994 | Gauger et al. . | |
| 5,366,268 | 11/1994 | Miller et al. . | |
| 5,462,332 | 10/1995 | Payne et al. . | |

FOREIGN PATENT DOCUMENTS

| | | |
|---|---|---|
| 0089744 | 9/1983 | European Pat. Off. . |
| 0366364 | 5/1990 | European Pat. Off. . |
| 2278526 | 2/1976 | France . |
| 2624451 | 6/1989 | France . |

OTHER PUBLICATIONS

Japanese Abstract Appln No. 55133524, Dated Sep. 25, 1980.

Primary Examiner—Ramon O. Ramirez
Assistant Examiner—Stephen S. Wentsler
Attorney, Agent, or Firm—Young & Basile

[57] ABSTRACT

A power seat adjuster includes a drive link fixed to a torsion tube rotatably supported between the upper tracks of a pair of track assemblies. One end of the drive link is pivotally connected to a first leg depending from an upper seat support frame member. First and second flanges respectively formed on the first end of the drive link and the first leg lie in an intersecting path for engagement upon rotation of the first end of the drive link beyond a normal end travel position to resist continued rotation of the first end of the drive link and the upper seat support frame. Similar cooperating flanges are formed on a slave drive link and on the lost motion strut of a rear elevating mechanism.

16 Claims, 5 Drawing Sheets

5,730,411

ANTI-ROTATIONAL LINK FOR REARWARD IMPACT LOADING ON VEHICLE POWER SEAT ADJUSTER

BACKGROUND OF THE INVENTION

The present invention relates, in general, to vehicle seats and, more specifically, to adjusters for vehicle seats.

DESCRIPTION OF THE ART

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes an electric motor which bi-directionally rotates a pair of drive shafts extending outward from the motor to a gear assembly or box mounted on each upper track. In one arrangement, each gear box rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front and rear edges of the seat bottom independent of each other as well as to simultaneously raise and lower the entire vehicle seat or, in some applications, only the seat bottom or cushion.

Each vertical and recliner drive mechanism also typically includes a drive motor having a rotatable output shaft connected to a gear assembly either directly in the case of the front and rear vertical drive mechanisms or by means of two shafts extending from a single motor to separate gear assemblies mounted on each upper track or on the seat support frame in the case of a seat recliner drive mechanism.

In the front and rear edge vertical adjustment drive mechanisms, the lead screw is usually threaded into one end of a tubular drive nut. The other end of the tube is formed with a slot which is mounted about one end of a drive link and pivotally connected thereto by a pivot pin. The drive link is fixedly mounted on a torsion tube which extends between mounting brackets on the upper tracks of the pair of track assemblies of the power seat adjuster. Another end or portion of the drive link is pivotally connected to a flange or leg extending from the upper seat support frame in the case of the front drive link or, for the rear drive link, to a slave link which is pivotally connected to a flange or leg extending from the rear end of the upper seat support.

Rotation of the lead screw in either direction causes linear movement of the drive nut and thereby a pivotal movement of the drive link in either a clockwise or counterclockwise direction to elevate or lower the front end of the upper seat support frame. Since the drive link is fixed on one end of the torsion tube, rotation of the drive link results in simultaneous rotation of the torsion tube, which rotation is transmitted to the drive link on the opposed track assembly thereby resulting in simultaneous elevation or lowering of both front edges of the upper seat support frame.

Seat adjuster components are designed to withstand normal occupant loads and also to resist movement during a collision to enable the vehicle restraint systems, i.e., seat and shoulder belts, to function in a proper manner. When a vehicle is impacted from the rear, the impact forces cause the occupant to be thrown rearwardly into the seat back. If the rear impact forces are high enough, the occupant load on the seat back tends to deflect the seat back rearwardly from its normal upright position about its pivot connection to the seat track assembly. If the angle of deflection of the seat back is high enough, the occupant could be propelled rearwardly over the seat back, particularly if the occupant is not wearing a seat and/or shoulder belt.

Also during a rear collision, the lower tracks of the seat adjuster move forward with the vehicle, while the upper seat tracks and seat bottom are subjected to occupant forces which tend to move the upper seat tracks rearwardly. This imposes high forces on the seat adjuster which, if high enough, could cause upward bending of the torsion tube. This deformation leads to rotation of the front drive link beyond its full elevation limit of travel and causes further rotation of the front end of the seat adjuster upwardly and rearwardly resulting in greater rearward deflection of the upper portion of the seat back.

At the same time, the rear drive links which are connected to a rear torsion tube and by a slave link to the rear edges of the seat support frame are subjected to the same excess rotational forces which are exacerbated by the continued upward and rearward rotation of the front edges of the seat support frame. Such forces, if high enough, could cause rearward and downward rotation of the rear drive links which drops the rear end of the seat bottom causing the occupant to strike the seat back at a higher point thereby increasing the deflection load on the seat back.

Prior efforts to limit rotation of the seat back during a rear vehicle collision have been directed solely to inhibiting excessive rotation of the rear drive link beyond its end limits of travel. Such efforts, as shown in FIG. 4, have employed an extension or nose added to one end of a lost motion strut or slave link pivotally connected between the rear end of the seat support frame and the rear drive link and positioned to engage the lower bottom surface of the upper seat support when the rear drive link reaches its full rotational position during normal travel.

It would be desirable to provide a simple and inexpensive means for limiting rotation of the upper seat support beyond its normal end limit of travel upon a rear impact on a vehicle. It would also be desirable to provide an anti-rotation means is employable with the drive and/or slave links of a vehicle power seat adjuster and, further, which does not require significant modification to existing power seat adjuster component design. Finally, it would be desirable to provide an anti-rotation means to either or both of the front and rear drive links and slave links of a power seat adjuster.

SUMMARY OF THE INVENTION

The present invention is an anti-rotational means for use in a vehicle seat adjuster which resists continued rotation of at least the front elevating mechanism beyond a normal end limit of travel upon rear impact loading as would occur in the event of a rear collision with the vehicle.

The present power seat adjuster includes an upper seat support frame member having a first leg projecting therefrom. A torsion tube extends between and is coupled to the upper tracks of the first and second track assemblies. A link means are carried on the torsion tube and is pivotal with respect to a longitudinal axis along the torsion tube for moving the first leg and the upper seat support frame member. Cooperating surface means are carried with the first leg and the link means and disposed for engagement of the first leg and the link means upon movement of the link means beyond a normal end travel limit to resist continued rotation of the link means.

The cooperating surface means preferably includes a first flange carried with and extending angularly from a link, and means, carried with the first leg and lying in a path of rotation of the first flange for engaging the first flange upon rotation of the link beyond the normal end travel limit. The cooperating surface means also includes a flange carried with and extending angularly from the first leg of the upper seat support frame member.

Alternately, the cooperating surface means includes means, carried with the link means and lying in a path of rotation of the first leg, for engaging the first leg upon a predetermined rotation thereof.

In an exemplary embodiment, the cooperating surface means includes a first flange carried with and extending angularly from a first link and a second flange carried with and extending angularly from the first leg of the upper seat support frame member. Preferably, the first and second flanges are respectively substantially perpendicular to the first link and the first leg.

In an exemplary embodiment. The torsion tube is rotatably coupled to each upper track of the first and second track assemblies. A drive link is fixedly carried on the torsion tube to rotate the torsion tube upon rotation of the drive link by a drive means. Another drive link is mounted on the other end of the torsion tube in conjunction with the opposed upper track assembly. An opposed upper seat support frame member also has a first leg extending therefrom. The drive means is connected to a first end portion of one drive link. An end portion of the other drive link is rotated by rotation of the torsion tube to simultaneously elevate one end of both of the upper seat support frame members.

Alternately, the rotating means includes a second link fixedly connected to the torsion tube and drive means, connected to the second link, for rotating the second link and the torsion tube. Preferably, the drive link and the second link are integrally formed as a one-piece member fixedly carried on the torsion tube.

The anti-rotational means of the present invention resists continued rotation of the front edge of the upper support frame of a vehicle seat adjuster beyond a normal end travel limit upon rear impact loading on the vehicle. The cooperating surface means or flanges forming the anti-rotational means of the present invention may be formed on the conventional front drive links and a leg extending from the front edge of the upper seat support frame member without extensive modification to such components.

The anti-rotation means of the present invention may also be applied to the rear elevating mechanism of a power seat adjuster. In this case, a flange is formed on the slave link or strut pivotally connected between the rear drive link and a leg extending from the rear end of the upper seat support frame. The flange on the slave link or strut engages the leg on the upper seat support to resist further rotation of the slave link and the rear end of the upper seat support beyond its normal fully rotated travel position.

The anti-rotational means provides a significant advantage by preventing excessive elevation of the front edge of the seat adjuster upon rear impact loading which would normally cause the seat back to pivot in a rearward and downward direction and pose a safety hazard to the occupant of the seat.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
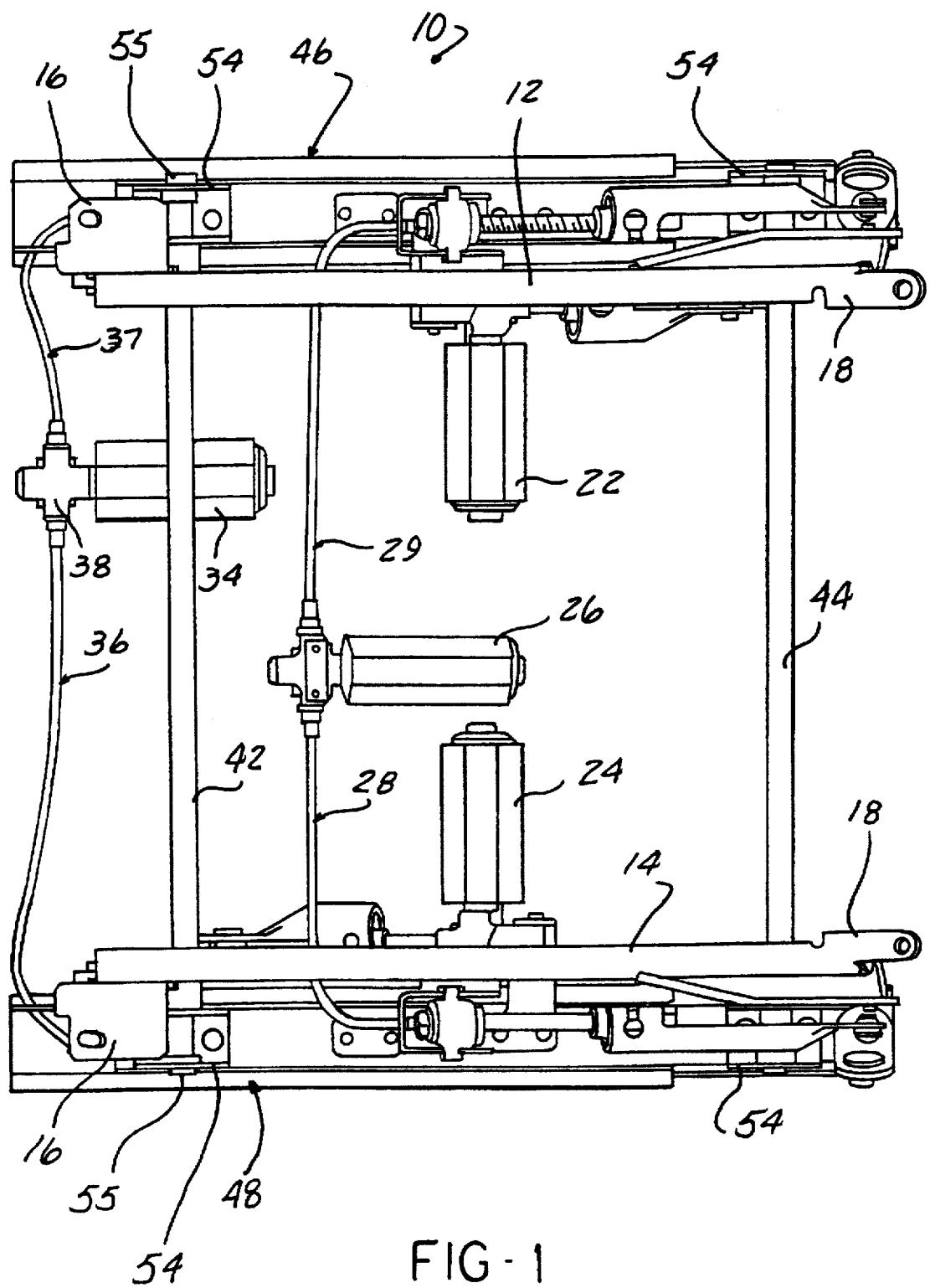
FIG. 1 is a plan view of a prior art power seat adjuster.
Figure 2:
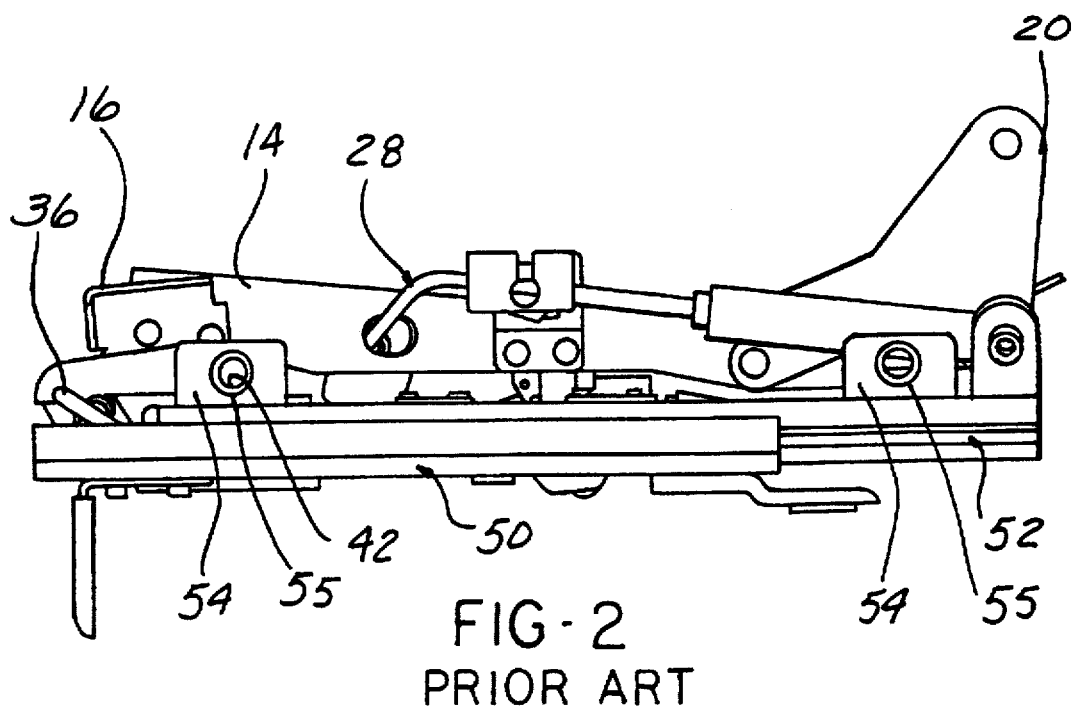
FIG. 2 is a side elevational view of the prior art power seat adjuster shown in FIG. 1.

Referring now to the drawing, and to FIGS. 1 and 2 in particular, there is illustrated a conventional, prior art power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster, as well as pivotal tilting of the seat back with respect to the seat bottom. It will be understood, however, that the present invention described hereafter is employable with a power seat adjuster which includes independent front and rear edge vertical adjustment mechanisms or vertical adjustment of the entire seat adjuster as in a "four-way" seat adjuster.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 to provide a mounting surface for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10.

Various drive assemblies are mounted on the power seat adjuster 10 to provide selective movement of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws, each carried in one of the two track assemblies.

The power seat adjuster 10 also includes a horizontal drive means formed of a bi-directional electric motor 34 which is fixedly mounted to one of the upper tracks of the power seat adjuster 10 by means of a suitable bracket, not shown. A pair of rotatable drive shafts 36 and 37 extend outward from a gear assembly or box 38 integrally connected to the output shaft of the drive motor 34 to a rotatable connection with a lead screw disposed in each of a pair of opposed track assemblies as described hereafter.

As each of the track assemblies 46 and 48 is identically constructed, the following description will be provided for only track assembly 48. It will be understood that the opposite track assembly 46 is constructed in the same manner. The track assembly 48 includes a lower track 50 and an upper track 52. The upper track 52 is slidably disposed within the lower track 50 and is reciprocatingly, bi-directionally movable along the lower track 50 under the control of the horizontal drive means.

The upper track 52 may take any of a number of different configurations which typically include a pair of side walls depending from a top wall and which terminate in flanges which are slidably disposed in channels formed in the lower track 50.

The power seat adjuster 10 also includes front and rear tubular torsion tubes or rods 42 and 44, respectively, which extend between and are connected to the opposed track assemblies 46 and 48 to provide a rigid support structure for the power seat adjuster 10. As shown in FIGS. 1–2, each end of each torsion tube 42 and 44 is rotatably mounted in suitable mounting brackets denoted generally by reference number 54 which are fixed to opposite ends of each upper track 52. A fastener 55, such as a conventional push nut, is mounted on the outer end of each torsion tube 42 and 44 to securely retain each torsion tube 42 and 44 in the associated mounting bracket 54.

Figure 3:
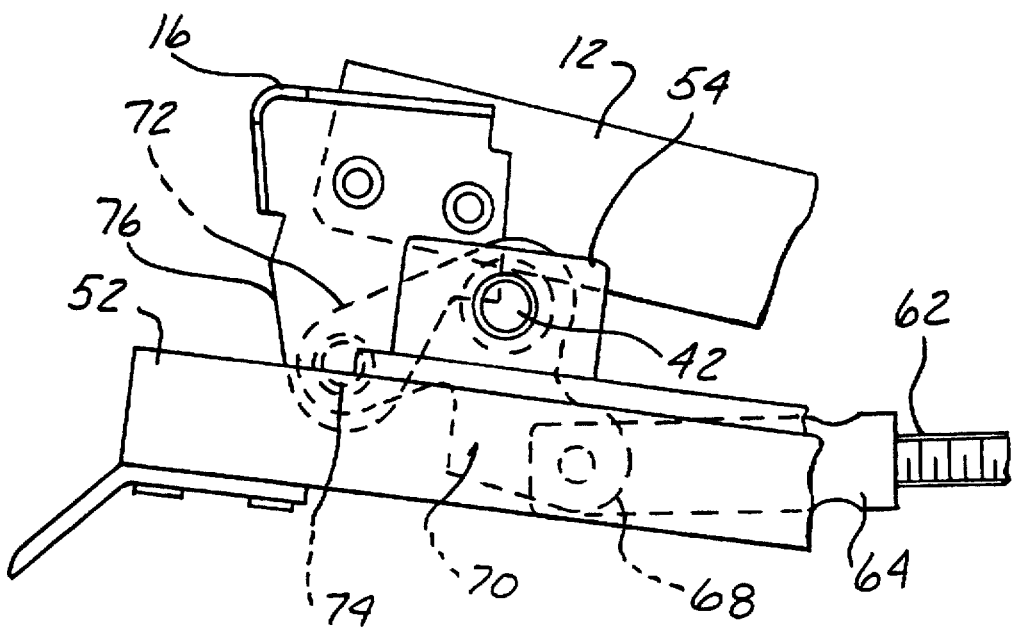
FIG. 3 is an enlarged, partial side elevational view showing the front motion control link of the prior art power seat adjuster shown in FIGS. 1 and 2 deployed in an elevated position.
Figure 4:
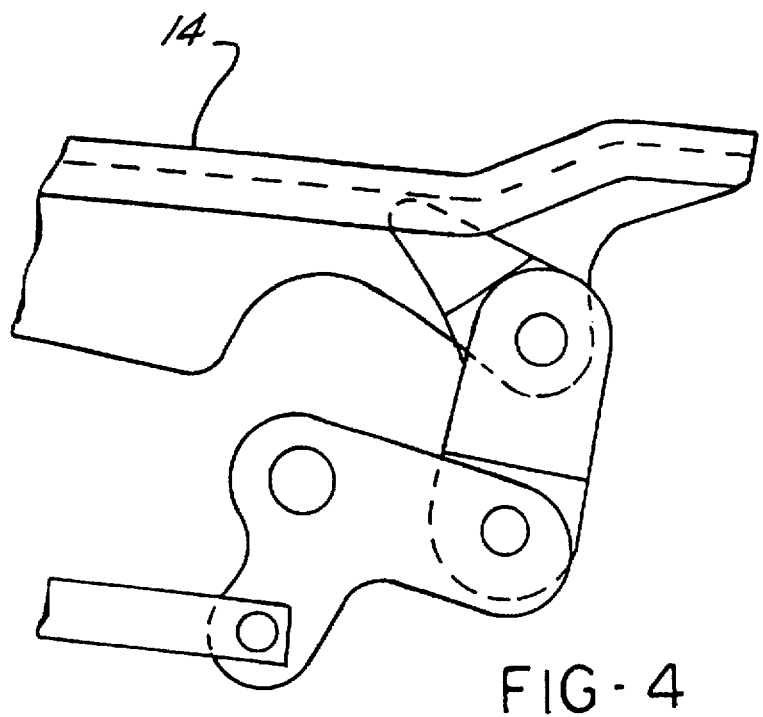
FIG. 4 is a side elevational view of a prior art anti-rotational linkage employed on the rear edge elevating mechanism.

As shown in FIG. 1, and in greater detail in FIG. 3, the front vertical drive motor 22 has a rotatable output shaft, not shown, which is connected to a gear means or box mounted in a housing pivotally affixed to one of the upper tracks 52. A front vertical lead screw 62 is coupled to the gear means and extends rotatably outward therefrom. An internally threaded, tubular drive nut 64 receives the free end of the lead or drive screw 62. The front end of the tube 64 has a central axial slot 66 FIG. 5. The slot 66 provides a clearance opening within which there is disposed one end portion 68 of a front drive link 70.

As shown in FIG. 3, the front drive link 70 has a generally planar shape with a central portion disposed about the front torsion tube 42. The central portion is fixedly connected to the torsion tube 42 by suitable means, typically by welding. The end portion 68 projects angularly in one direction from the central portion as shown in FIG. 3.

Another end portion 72 projects from the central portion of the front drive link 70 in an opposite direction from the opposed end portion 68. The end portion 72 is pivotally connected by means of a pivot pin 74 to a leg or flange 76 depending from the mounting bracket 16 secured to the upper seat support 12.

In an alternate construction, the front drive link 70 may be constructed in two separate links, each fixed at one end to the torsion tube 42. One link is connected to the drive nut 64 and the other link is connected to the leg 76.

In general operation, bidirectional linear movement of the tube 64 by means of rotation of the lead screw 62 results in clockwise or counterclockwise pivotal movement of the front drive link 70. Such pivotal movement results in pivotal movement of the end portion 72 of the front drive 70 to effect elevation or lowering of the leg 76 and the mounting bracket 16 and thereby the front edge of the upper seat support 12.

Figure 5:
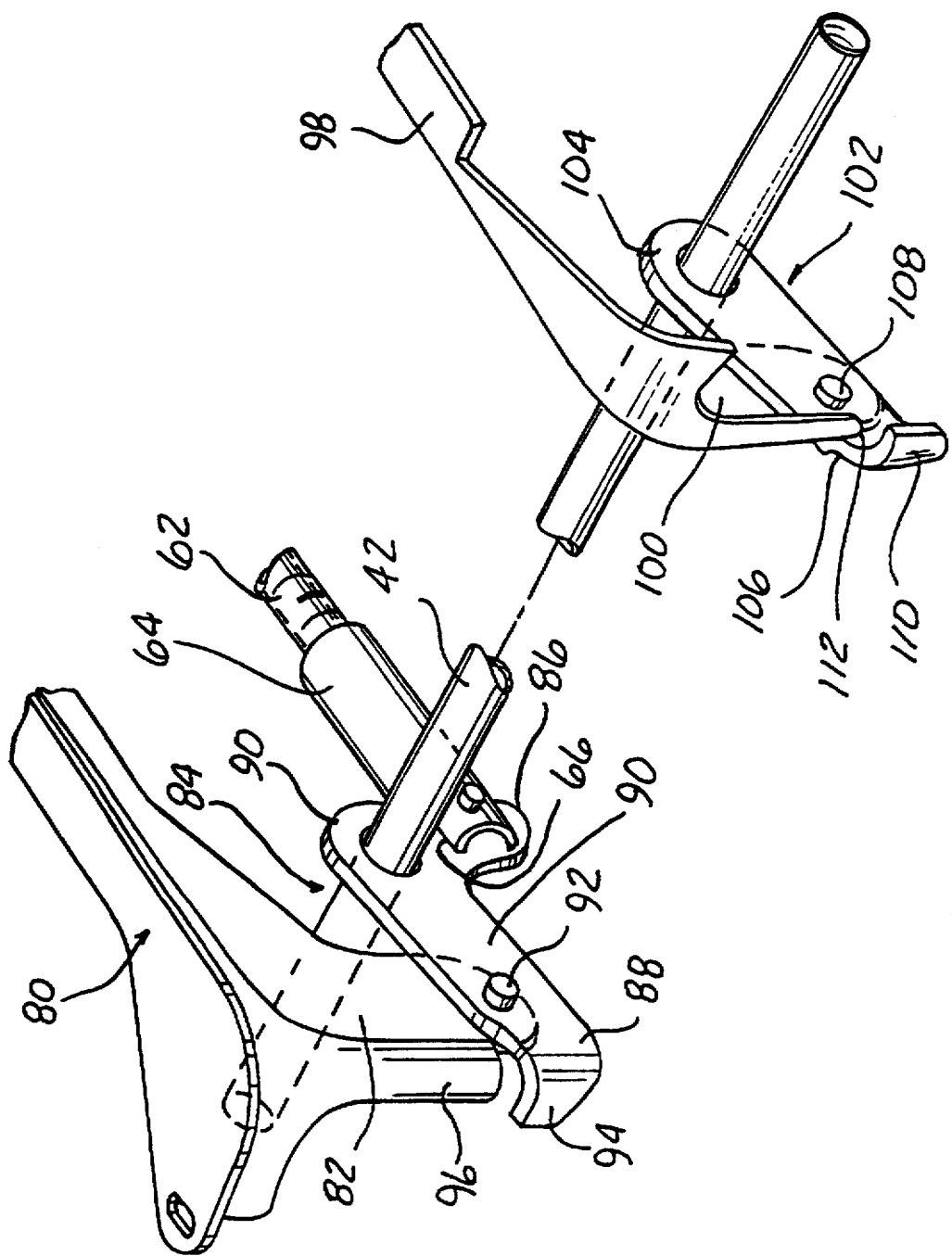
FIG. 5 is a perspective view of a front edge vertical adjustment mechanism employing the anti-rotational means of the present invention, with the front adjustment mechanism depicted in an elevated seat adjuster position.
Figure 6:
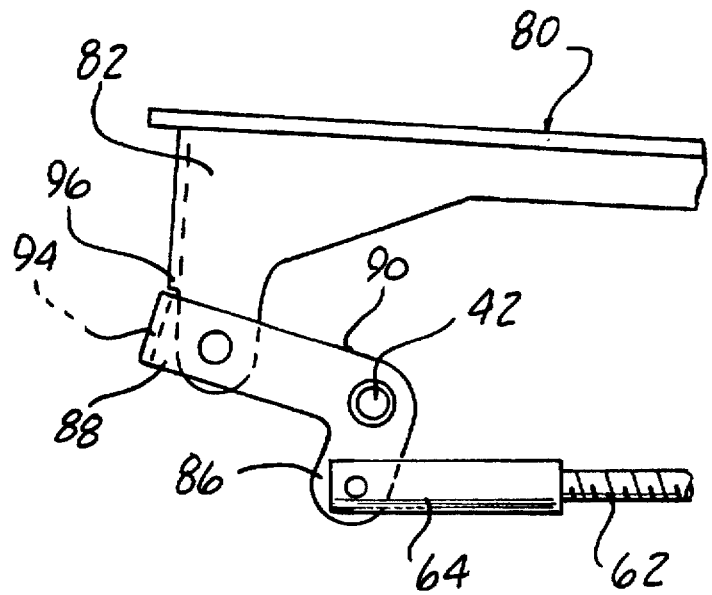
FIG. 6 is a side elevational view of the anti-rotational means shown in FIG. 5; but depicted in an anti-rotation position.

Referring now to FIGS. 5 and 6, there is depicted an improvement according to the present invention which provides anti-rotational features to one front drive link 70 which resists continued rotation of the front drive link 70 beyond its fully elevated end limit of travel. In this embodiment, the front edge of the seat support frame 12 and the front mounting bracket 16, shown in FIG. 3 have been combined into an integral one-piece member 80 with a depending leg or flange 82 disposed at a front end.

As shown in FIG. 5, the front master drive control link 84 has a generally planar shape with opposed end portions 86 and 88 extending angularly from an intermediate portion 90. The intermediate portion 90 is fixedly coupled to one end of the front torsion tube 42 by welding, etc. The one end portion 86 is disposed in the slot 66 in the drive nut 64 and pivotally connected to the drive nut 64 by a pivot pin. The other end portion 88 is pivotally connected to leg 82 also by a pivot pin 92.

According to the present invention, cooperating surface means are carried or formed on the leg 82 and the end portion 88 of the front drive link 84 for cooperating engagement upon a predetermined amount of rotation of the end portion 88 of the front drive link 84 to resist continued rotation of the end portion 88 of the front drive link 84 in a direction beyond its fully elevated end limit of travel which would normally result in continued elevation of the upper seat support frame 80. The cooperating surface means preferably includes a first surface or flange 94 carried at an end of the end portion 88 of the front drive link 84. The first flange 94 is angularly disposed from the plane of the front drive link 84, and is, by way of example only, disposed substantially perpendicular to the plane of the front drive link 84. A second surface or flange 96 is formed on the leg 82 of the upper seat support 80. The second flange 96 is angularly disposed from the plane of the leg 82, and is substantially perpendicular to the plane of the leg 82, by way of example.

The first and second flanges 94 and 96 are formed with suitable lengths and at suitable positions on the end portion 88 of the front drive link 84 and the leg 82, respectively, to lie in the plane of rotation of each other so as to be brought into intersecting engagement or interference upon a predetermined amount of rotation of the end portion 88 of the front drive link 84 such as would occur if the end portion 88 rotates further clockwise from its fully elevated end travel position shown in FIG. 5 to a position shown in FIG. 6.

In a normal, fully elevated seat bottom position, as shown in FIG. 5, at which the front drive link 84 is at its end limit of travel, the first and second flanges 94 and 96 are normally spaced apart. However, upon clockwise rotation of the end portion 88 beyond its normal fully elevated position as would result of a high force rear impact on the vehicle, the first flange 94 moves into engagement with the second flange 96 as shown in FIG. 6. This engagement resists further continued rotation of the end portion 88 of the front drive link 84 which would normally cause continued rotation and elevation of the front end of the upper seat support 80. The metal to metal contact between the first and second flanges 94 and 96 provides a high strength connection which resists such continued rotation.

As also shown in FIG. 5, the opposite upper seat support frame 98 also has a depending leg 100 at a front end. A front slave drive link 102 is fixedly mounted at a first end 104 to an opposite end of the front torsion tube 42. The front slave drive link 102 has a generally planar shape with a second opposed end 106 spaced from the first end 104. Since the front slave drive link 102 is fixedly coupled, such as by welding, to the front torsion tube 42, rotation of the front torsion tube 42 by the front master drive link 84, as described above, through movement of the drive nut 64 by rotation of the threaded lead screw 62, the front slave drive link 102 will rotate in the same direction as the front master drive link 84.

The front slave drive link 102 is pivotally connected to the leg 100 of the upper seat support frame 98 by a pivot pin 108.

Cooperating surface means are also formed on the leg 100 of the upper seat support frame 98 and the front slave drive link 102. In the same manner as described above, the cooperating surface means comprises a first flange 110 extending angularly from the second end 106 of the front slave drive link 102 and a flange or surface 112 formed on the leg 100 of the upper seat support frame 98. The flanges 110 and 112 are similarly formed and angularly oriented in the same manner as the flanges 94 and 96 described above on the opposed leg 82 and front master drive link 84. In this manner, both pairs of flanges 94 and 96 and 110 and 112 are brought into interfering engagement upon continued rotation of the front drive links 84 and 102 beyond their fully elevated normal positions.

Figure 7:
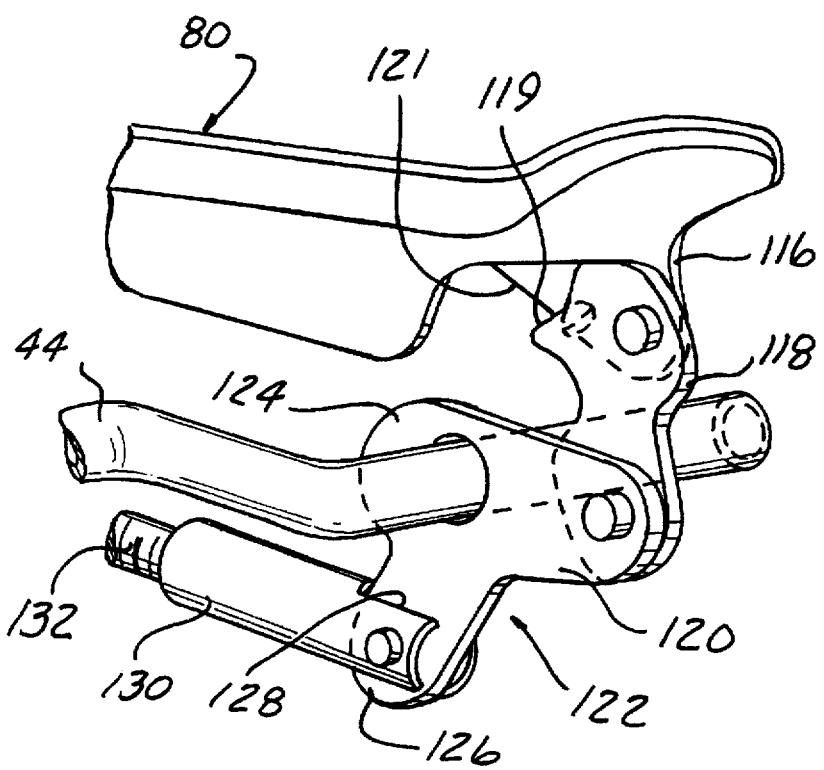
FIG. 7 is a perspective view of the outboard portion of the rear elevating mechanism employing the anti-rotational means of the present invention.

The anti-rotational link means of the present invention may also be employed on the rear elevating mechanism of the power seat adjuster 10 exclusively or in conjunction with the use of the anti-rotational link means on the front elevating mechanism as described above. As shown in FIG. 7, in the rear elevating mechanism, the upper seat support frame 80 has a depending flange or leg 116 extending from a rear end. The leg 116 is pivotally connected to one end of a lost motion strut 118, the opposite end of which is pivotally connected to one end portion 120 of a rear master drive link 122. An intermediate portion 124 of the rear master drive link 122 is fixedly mounted, such as by welding, etc., to the rear torsion tube 44. Another end portion 126 of the rear master drive link 122 is mounted in a slot 128 formed at one end of a tubular drive nut 130 and pivotally connected thereto by a pivot pin. The drive nut 130 has an internally threaded bore which engages a drive member, such as a threaded lead screw 132 rotatably driven by the rear drive motor 24, shown in FIG. 1, either directly or via an intervening gear means or box, not shown.

Cooperating surface means are formed on the strut 118 and the leg 116 of the upper seat support 80. The cooperating surface means includes a flange 119 carried on the strut 118 and extending from one edge thereof and an edge 121 on the leg 116. The flange 119 projects out of the plane of one end of the strut 118 to engage the edge 121 on the leg 116 upon rotation of the strut 118 beyond a normal travel rotation position.

Figure 8:
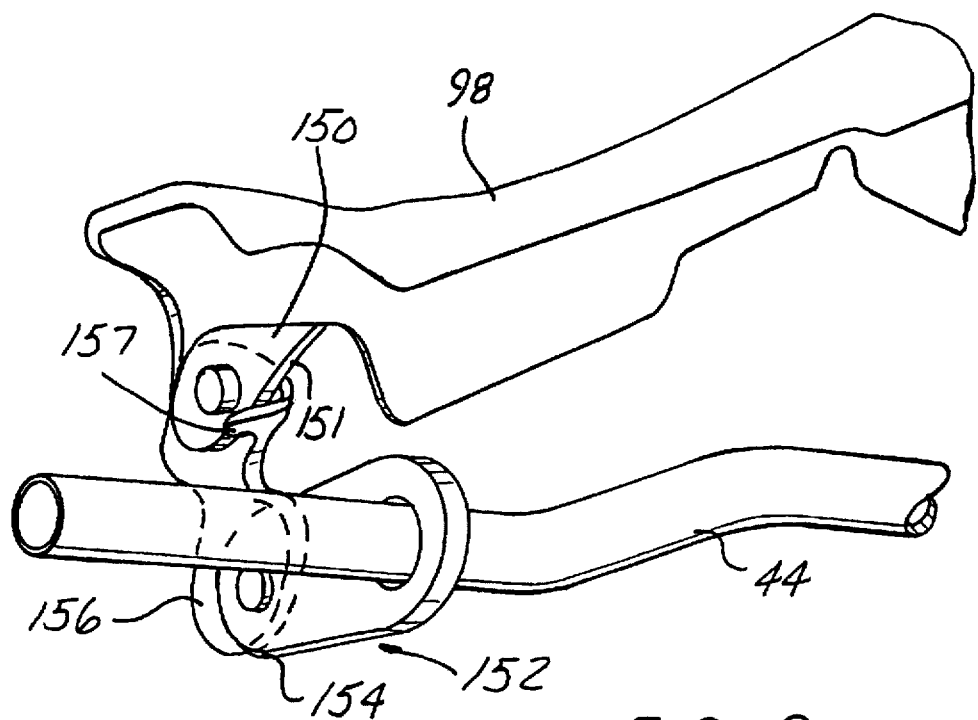
FIG. 8 is a perspective view of the inboard portion of the rear elevating mechanism also including the anti-rotational means of the present invention.

FIG. 8 depicts the opposed slave rear elevating mechanism in which a leg 150 projects from a rear end of the opposite upper seat support frame 98. A slave rear slave drive link 152 is fixedly coupled to one end of the rear torsion tube 44 by welding or other suitable means. An opposite end 154 of the rear slave drive link 152 is pivotally connected to one end of a lost motion strut 156, the opposite end of which is pivotally connected to the leg 150 on the upper seat support frame 98.

Cooperating surface means in the form of a flange 157 on the strut 156 and an edge 151 on the leg 150 function in the same manner as the flange 119 and the edge 121 on the leg 116 on the opposite rear elevating mechanism as described above and shown in FIG. 7.

In summary, there has been disclosed a unique anti-rotational means employable with the front and/or rear elevating mechanism of a vehicle power seat adjuster which resists continued rotation at least of the drive or slave links from their full travel limits when the power seat adjuster is loaded with rear impact forces tending to elevate the front edge of the seat adjuster and lower the rear edge of the seat adjuster. The anti-rotational means is simple and inexpensive in construction and may be added to existing seat adjuster structure without significant modification to the existing components of the power seat adjuster.

What is claimed is:

1. A power seat adjuster comprising:

first and second spaced track assemblies, each including an upper track reciprocally movable with respect to a lower track;

an upper seat support frame member associated with each upper track and each having a first leg projecting therefrom;

a torsion tube extending between and coupled to the upper tracks of the first and second track assemblies;

a first link means, carried on the torsion tube and pivotal with respect to a longitudinal axis along the torsion tube, for rotating the torsion tube;

means for pivotally connecting the first link means to the first leg for movement of the first leg and the associated seat support frame member upon movement of the first link means; and cooperating surface means, carried with the first leg and the first link means, for generating engagement between the first leg and the first link means upon movement of the first link means beyond a normal end limit of travel to resist continued rotation of the first link means and the connected first leg and upper seat support frame member, the cooperating surface means including:

a first surface carried with the first leg; and a second surface carried with the first link means, the first and second surfaces lying in intersecting paths of rotation for locked, non-moving engagement upon rotation of the first link means beyond the normal end limit of travel.

2. The power seat adjuster of claim 1 wherein:

the first link means is fixed to the torsion tube.

3. The power seat adjuster of claim 1 wherein:

the first link means is fixed to the torsion tube and has first and second end portions;

the pivotally connecting means pivotally connects the first end portion to the first leg; and further including:

means, connected to the second end portion of the first link means, for rotating the first link means and the torsion tube.

4. The power seat adjuster of claim 3 further comprising:

a second link fixed to an opposite end of the torsion tube and pivotally connected to the first leg of the other upper seat support frame member associated with the other upper track.

5. The power seat adjuster of claim 4 wherein:

the upper seat support frame members are disposed at a forward end of the first and second track assemblies.

6. The power seat adjuster of claim 4 wherein:

the upper seat support frame members are disposed at a rear end of the first and second track assemblies.

7. The power seat adjuster of claim 3 wherein the cooperating surface means comprises:

a first flange carried with and extending angularly from the first end portion of the first link means, the second surface carried on the first flange.

8. The power seat adjuster of claim 3 wherein the cooperating surface means comprises:

a flange carried with and extending angularly from the first leg of the upper seat support frame member, the first surface carried on the flange.

9. The power seat adjuster of claim 3 wherein the cooperating surface means comprises:

a first flange carried with and extending angularly from the first end portion of the first link means, the second surface carried on the first flange; and a second flange carried with and extending angularly from the first leg of the associated upper seat support frame member, the first surface carried on the second flange.

10. The power seat adjuster of claim 9 wherein:

the first flange is substantially perpendicular to the first end portion of the first link means; and the second flange is substantially perpendicular to the first leg of the upper seat support frame member.

11. The power seat adjuster of claim 9 wherein:

the second flange lies in the path of rotation of the first flange.

12. The power seat adjuster of claim 3 further comprising:

the torsion tube is rotatably coupled to each upper track of the first and second track assemblies; and the first link is fixedly carried on the torsion tube to rotate the torsion tube upon rotation of the first link by the rotating means.

13. The power seat adjuster of claim 3 wherein the pivotally connecting means further comprises:

a strut interposed between and pivotally connected to the first leg of the upper seat support frame at one end and to the first end portion of the first link means at an opposed end, the second surface carried on the strut.

14. The power seat adjuster of claim 1 wherein:

the first surface and the second surface of the cooperating surface means are spaced apart when the first link means and the first leg of the upper seat support frame member are at the normal end limit of travel.

15. A power seat adjuster comprising:

first and second spaced track assemblies, each including an upper track reciprocally movable with respect to a lower track;

an upper seat support frame member having a first leg projecting therefrom;

a torsion tube rotatably extending between and carried on the upper tracks of the first and second track assemblies;

drive link means having first and second portions, and fixedly mounted to the torsion tube, for rotating the torsion tube upon rotation of the drive link means;

means, connected to the second portion of the drive link means, for rotating the first end portion of the drive link means and the torsion tube;

a first flange carried with and extending angularly from the first leg of the upper seat support frame member and the first leg pivotally connected to the first end of the drive link means; and the first flange and the first portion of the drive link means lying in an intersecting path of movement for locked, non-moving engagement upon rotation of the first portion of the drive link means beyond a normal end travel position to resist continued rotation of the first portion of the drive link and the connected upper seat support frame member.

16. A power seat adjuster comprising:

first and second spaced track assemblies, each including an upper track reciprocally movable with respect to a lower track;

an upper seat support frame member associated with each upper track and having a first leg projecting therefrom;

a torsion tube extending between and coupled to the upper tracks of the first and second track assemblies;

a first link carried on the torsion tube and pivotal with respect to a longitudinal axis along the torsion tube;

the first link having first and second end portions;

means, connected to the second end portion of the first link, for rotating the first link and the torsion tube;

a strut pivotally connected at a first end to the first leg, the strut having an opposed second end;

the first link pivotally connected at the first end portion to the second end of the strut;

cooperating surface means, carried with the first leg and the strut, for effecting engagement between the first leg and the strut upon movement of the first link and the strut beyond a normal end limit of travel to resist continued rotation of the strut, and the first leg and upper seat support frame member connected thereto the cooperating surface means including:

a first surface carried with the first leg; and a second surface carried with the strut, the first and second surfaces lying in intersecting paths of rotation for locked, non-moving engagement upon rotation of the strut beyond the normal end limit of travel.

* * * * *